Patented Nov. 12, 1935

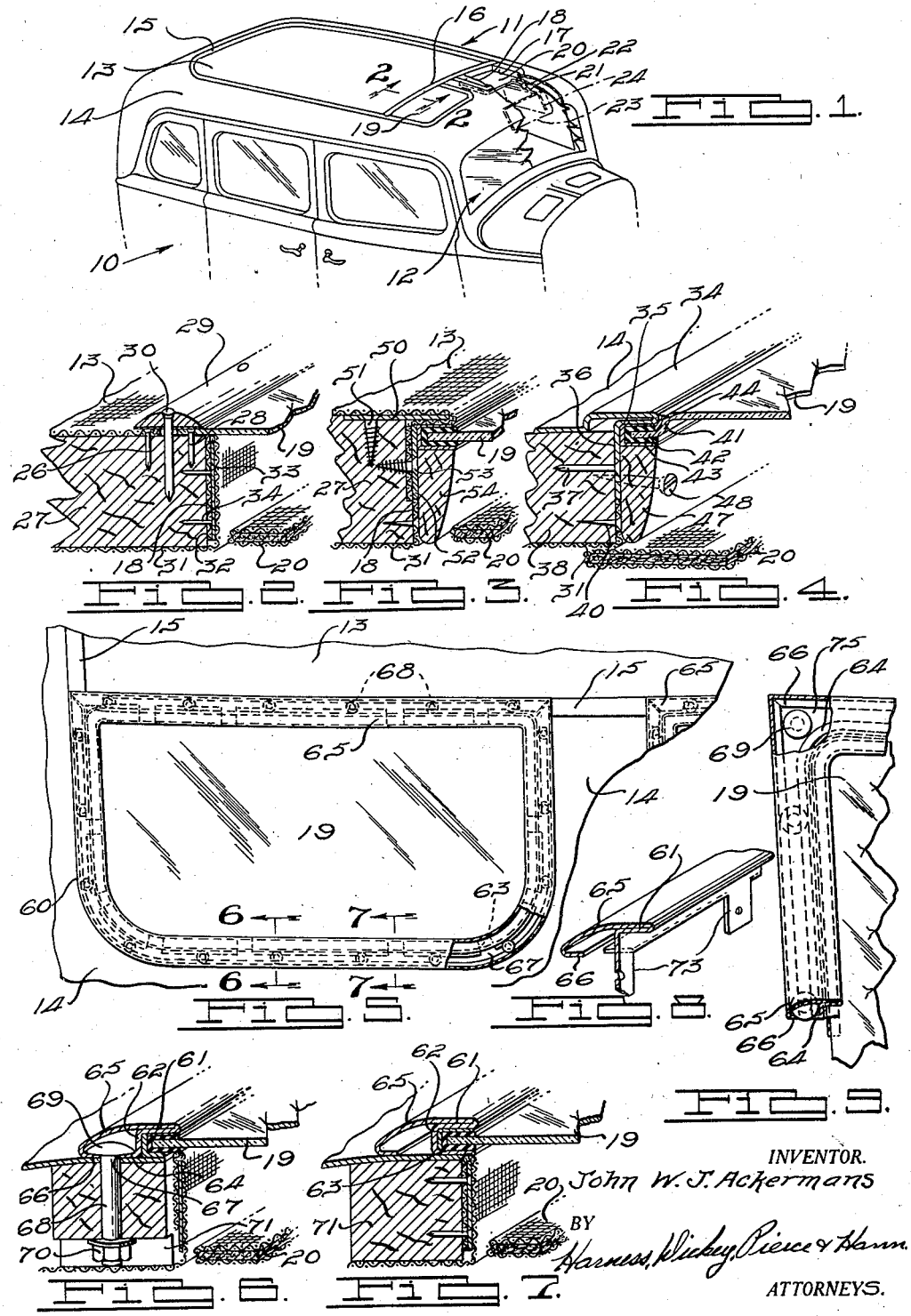

2,020,346

UNITED STATES PATENT OFFICE 2,020,346

VEHICLE BODY CONSTRUCTION

John W. J. Ackermans, Detroit, Mich.

Application February 15, 1933, Serial No. 656,873

8 Claims. (Cl. 296—137)

The invention relates to vehicle body constructions and it has particular relation to the roof of the vehicle body and a shield member incorporated therein.

One object of the invention is to provide a transparent shield member in the roof of an automobile body which will allow light from above the roof to pass therethrough into the interior of the body.

Another object of the invention is to provide a construction of the aforesaid character wherein the shield member is located adjacent the windshield and the driver's seat so that the driver will be able to see overhead traffic signal lights without stooping or bending to see the signal through the windshield.

Another object of the invention is to provide a transparent shield member in a roof of an automobile body, and means for covering the shield member at will so that light may or may not be allowed to pass through the shield into the interior of the body according to the wishes of an occupant of the vehicle.

Another object of the invention is to provide a transparent shield member in the roof of an automobile body adjacent the windshield, and an anti-glare shield which may selectively be used either to prevent light glare through the windshield or through the shield in the roof.

Another object of the invention is to provide various and efficient means for mounting a shield member in the roof of a vehicle, so as to hold the shield positively in place, seal its edges against leakage, and enable manufacture and installation of the shield in the roof in an economical and efficient manner.

Other objects of the invention will become apparent from the following specification taken in conjunction with the drawing and from the claims hereinafter set forth.

For a better understanding of the invention reference may be had to the drawing illustrating preferred forms of the invention, wherein:

Figure 1 is a fragmentary and perspective view of the upper part of an automobile body, particularly illustrating transparent shield members in the roof as constructed acording to one form of the invention.

Fig. 2 is a cross-sectional view on a larger scale taken substantially along the line 2—2 of Fig. 1.

Figs. 3 and 4 are cross-sectional views similar to Fig. 2, but illustrating other means for mounting and retaining the shield in the roof construction.

Fig. 5 is a fragmentary plan view of the roof of an automobile, illustrating a shield mounted therein which is constructed according to another form of the invention.

Fig. 6 is a cross-sectional view on a larger scale taken substantially along the line 6—6 of Fig. 5.

Fig. 7 is a cross-sectional view on a larger scale taken substantially along the line 7—7 of Fig. 5.

Fig. 8 is a fragmentary and perspective view illustrating a form of shield retaining frame constructed according to another form of the invention.

Fig. 9 is a fragmentary view illustrating a shield frame and shield therein, and particularly a different form of means for fastening the frame to the roof of the vehicle.

Referring to Fig. 1, a closed automobile body is indicated at 10, its roof at 11, and the windshield at 12. At the present time, it is conventional to have the central portion of the roof covered by a waterproof fabric as indicated at 13 and to have a sheet metal border indicated at 14 which constitutes integral extensions of sheet metal sides of the body. In sealing the joints between the fabric covering 13 and the metal margin 14, a molding strip 15 is provided and a suitable putty or solidified plastic is used to seal any interstices along the joint against possible leakage. In the particular construction illustrated, the sheet metal margin 14 at the front of the roof extends substantially to the line indicated at 16, and this portion of the metal covering and the roof construction therebeneath, is provided with a pair of oppositely disposed openings one of which is indicated at 17. Such openings are adapted to be closed or covered by transparent shield members indicated at 18 and 19.

It will be noted that one of the shields is located above the driver's side of the vehicle and it is desired that it be so positioned that the driver, by looking upwardly therethrough, may ordinarily observe overhead traffic signal lights particularly when the automobile has been stopped at an intersection and the driver is waiting for a change in signal lights so that he may proceed. Usually in the case of the overhead traffic signal particularly, it is very difficult, particularly when the automobile is next to the intersecting street, to see the signal through the windshield unless the driver bends or stoops to a point adjacent the lower portion of the windshield. With a shield located in the roof as mentioned, the driver in a situation such as mentioned, may readily see the overhead traffic signal without bending or stooping and it is manifest that this advantage would be readily appreciated by motorists.

The shield permits light from above the roof to enter the vehicle and at times this would be found desirable, while at other times it would be desirable to cover the shield and particularly when the sun is directly overhead or in such position that the light therefrom would be blinding to the driver or other occupants of the vehicle. For the purpose of covering the shield when this is desired, various types of covers might be used which could be manipulated by the occupant of the vehicle to either cover the shield or uncover it, and it has been found advantageous to use an anti-glare shield of the type employed at the present time for covering a portion of the windshield to prevent glaring light from blinding the driver of the vehicle. As illustrated in Fig. 1, this shield is shown at 20 and comprises a fabric covered opaque member pivotally supported on an arm 21 that in turn is universally connected, as indicated at 22, to an interior side portion of the automobile body adjacent the roof. Owing to the universal connection, the shield may be disposed as indicated at 23 in a position covering a portion of the windshield so that glaring light will not blind the driver. The universal connection also permits movement of the shield into covering relation with the transparent shield 18 in the roof and in Fig. 1 the covering shield is shown in its covering position. The universal connection also permits movement of the covering shield to a position indicated at 24 where it is along the side wall of the automobile body and out of either position covering the windshield or the transparent shield in the roof.

In mounting the shield in either of the openings as shown by Fig 2, the waterproof covering 13 may terminate adjacent the opening and be tacked, as indicated at 26, to a wooden cross member 27 forming a part of the roof frame. Along the edge of the opening next to the waterproof covering 13, the transparent shield 19 which is mounted from the upper side of the roof, may also be secured to the cross member 27 by fastening means indicated at 28. A convex molding strip 29 may overlap adjacent edges of the shield and waterproof covering and be secured to the cross member 27 by nails indicated at 30. For more positively preventing leakage along the joint, putty or other suitable solidifying plastic may be used in any interstices that may exist and may be disposed between adjacent edges of the shield and covering material and between the surfaces thereof and the cross member and molding. Ordinarily the inside of the roof is covered by a fabric which is indicated at 31 and this fabric may extend upwardly into the opening and along the side wall thereof and then be reversely bent downwardly as indicated at 32. Between the folded portion, a stiffening board 33 may be used and tacks 34 passing through this plate may penetrate the cross member 27 for securing the covering in place.

It may be stated at this time that the transparent shield member may comprise ordinary glass or a flexible sheet material having transparent qualities may be used such as celluloid, mica or the more recently known aluminum glass. If celluloid is used, it is preferable to coat it with a clear lacquer so as to preserve its cleanliness and prevent soiling thereof.

While Fig. 2 particularly illustrates the manner of fastening the shield in place along the edge of the waterproof material 13, it should be understood that the other edges of the shield may be mounted in the same manner in conjunction with the edges of the metal covering 14 or in other words that along the other three edges of the opening, the metal roof portion may extend similarly under molding such as the molding 29 in the same way that the waterproof covering extends under the molding. In the event an all metal roof is used, the mounting may be similar to that shown by Fig. 2 except that the metal roof takes the place of the fabric around all edges of the shield.

The covering shield 20 preferably is covered with a fabric having a texture and color similar to the fabric 31 on the inside of the roof, and the shield fits snugly within the opening in the roof and substantially flush with its lower edge so that in effect, the opening is not noticeable when the covering shield is disposed in the opening. It may be added that a covering shield 20 may also be provided for the opposite transparent shield 19, and mounted at the opposite side of the vehicle. Then with both covering shields fitting snugly in the openings in the roof, the openings are not noticeable. Covering shields of this character may be used in conjunction with any of the arrangements illustrated and described hereinafter.

Fig. 4 illustrates a modified way of mounting a shield along the edges of the metal border 14 extending around the three sides of the opening in front of the forward edge of the waterproof covering 13. In this construction, the metal roofing may be deflected upwardly as indicated at 34 and extended partially over the opening in the roof, then reversely bent as indicated at 35 to a point adjacent the side wall of the opening, and then extend downwardly along the side wall of the opening as indicated at 36. Such portion 36 extending along the side wall of the opening may be secured by nails 37 to a wooden frame member 38 forming a part of the roof construction. Preferably, the lower edge of the portion 36 terminates above the lower face of the frame member 37, to permit extension of the fabric inside covering 31 upward and along the side wall of the opening where it may be secured to the frame member 38 by tacks 40. In this construction the transparent shield may have its side edges turned downwardly as indicated at 41 and then extended parallel to the shield as indicated at 42 and the latter portion may be mounted in a rubber channel 43 fitting under the reversely bent portion 35 of the metal roof covering previously described. This type of shield is mounted from below the roof and any interstices between the folded edge of the metal roofing and the shield and around the rubber channel may be filled with putty or other suitable solidifying plastic to positively prevent ingress of water. For holding the shield upwardly against the portion 35 of the metal roofing, a molding strip 47 may be secured by means of screws 48 to the wooden frame member 37. In this construction the opaque shield 20 is shown as overlapping the edges of the opening instead of fitting thereinto.

Fig. 3 illustrates a slightly different way of mounting the shield with respect to the waterproof covering in that the latter extends around the free edge of a plate 50 secured by screws 51 to the wooden cross member 27 and which plate projects partially over the opening in the roof. The covering extending around the inner edge of the plate 50 is brought down and seated in a recess in the side wall of the frame member and is maintained in such recess by a plate 52 secured by screws 53 to the frame member. The inner covering 31 for the roof may extend partially up the side wall to the lower edge of plate 52 and there be secured by tacks to the frame member. In this construction the shield 19 is also inserted from below and is mounted in a rubber channel maintained against the fabric covered and extended part of the upper plate 50 by a molding 54 secured to the wooden frame member by screws. Any interstices around the rubber channel and edge of the shield may be sealed by putty or other suitable solidifying plastic.

It is apparent that each of the shield mountings shown by Figs. 3 and 4 is adaptable for a plane shield or a shield with downwardly turned edge as illustrated. Also it is apparent that the mounting shown by Fig. 4 is readily adaptable to the all metal roof cover.

In the construction shown by Figs. 5, 6 and 7, the shield is mounted in a frame adapted to be positioned around the opening in the roof. In using the frame illustrated, the metal roofing along three sides of the opening and the waterproof covering along the other side, may be brought up practically to the edge of the opening and, if desired, may extend down the side wall thereof. This frame includes a folded portion 61 defining one leg of a channel for receiving the shield, an extended portion 62 of the lower part of the fold to form a base for the channel, and lips 63 extending from the free edge of the portion 62 at spaced points to provide the other channel leg. Between the lips 63, the portion 62 may extend in the opposite direction as indicated at 64. The upper part of the fold 61 extends away from the channel and substantially in the plane of the shield and curves downwardly as indicated at 65 and finally terminates in a reversely bent portion 66 terminating in spaced relation to the free edge of the portion 64 to provide an elongated slot extending around the frame. It will be noted that the extension 65 forms a hollow portion of the frame and conceals the slot 67, from above the frame.

The frame is secured to wooden frame members of the roof by bolts 68 having heads 69 disposed in the hollow portion of the frame and engaging the portions 66 and 64 thereof at opposite sides of slot 67. Nuts 70 on the opposite ends of the bolts hold the frame in place and it will be noted that each bolt is of such length that the nuts are disposed upwardly of the inside fabric covering for the roof and for accomplishing this result the wooden frame member may be slotted at points as indicated at 71. The heads of the bolts may be inserted into the hollow portion of the frame at the points where the lips 63 are provided as at this point the space between the free edge of portion 66 and the base of the channel is sufficient to permit the insertion of the head on the bolt. Then upon moving the bolts along the slot until they are between the portions 64 and 66, the heads will be located so that they cannot move downwardly out of the hollow portion of the frame. The shield in this construction is mounted in a rubber channel disposed between the face of the roof and the folded portion 61 of the frame and at the points where the lips 63 are provided, the rubber channel is disposed between the folded portion 61 and such lips. When the shield is manufactured, it is preferred to have the lips 63 disposed in substantially the same plane as the base 62 of the channel and then upon inserting the shield mounted in its rubber channel, into a position against the folded portion 61 of the frame, the lips may be bent upwardly into their positions shown. As previously mentioned, any interstices around the edge of the frame or shield may be filled with a putty or other suitable solidifying plastic to prevent leakage in a positive manner. As previously described, the inside covering for the roof may be brought up against the side wall of the opening and be tacked in place so as to provide a neat appearing construction.

Fig. 8 illustrates a frame construction similar to that just described but wherein the base 62 of the channel, shown by Fig. 6, has extended lips 73 disposed in its plane. These lips may project down along the wall of the opening in the roof and may be secured thereto by screws or the like. In using this frame, the folded portion 61 may extend over the opening in the roof, and a shield such as shown in Figs. 3 and 4 may be mounted against the folded portion by molding, such as shown in the latter figures. The curved portion 65 of the frame naturally enhances the appearance of the roof.

Fig. 9 illustrates a slightly different form of frame but similar to that shown by Fig. 6, wherein instead of striking our projections 63 so as to enable insertion of the bolt head 69, the flange 64 is continuous and curves around the corner of the frame whereas the portion 66 extends to an apex to provide a larger space indicated at 75 through which the heads of the bolts may be inserted. Upon moving the bolts along the slot and away from the corner, it is apparent that the narrow portions of the slot will retain them in the hollow portion of the frame.

In connection with the constructions illustrated particularly by Figs. 5, 6 and 7, it is advantageous to build the frame flat, and then mount a flexible transparent shield therein by using the rubber channel and bending the lips 63 after the shield is in place in the frame. Then in mounting the shield and frame on the roof of the vehicle, the frame and flexible shield may be bent or curved to correspond with the contour of the roof. This would facilitate manufacture of the frame and also enable mounting the shield over openings in roofs of varying contours. It will be understood that in manufacturing a frame of this character, the sheet metal employed will be of such gauge or character that bending or curving of the frame will not be difficult.

It may be added that in several of the constructions illustrated, the shield is mounted substantially in the plane of the roof. Particularly in connection with Fig. 3, if a shield having a downwardly turned edge is used, such as shown by Fig. 4, the resulting construction is flush with the upper surface of the roof and there are no parts projecting above the roof. This is desirable in that a better appearance is provided, streamlining is promoted and the development of eddy currents is avoided.

It will be appreciated from the foregoing that transparent shields have been provided for use in conjunction with the roof of a vehicle and that various ways have been disclosed for mounting the shield in conjunction with openings in the roof. It will be appreciated that each arrangement may be efficiently constructed and that the appearance of the vehicle may even be enhanced by the use of constructions as illustrated. It will also be appreciated that the driver of the vehicle may readily see traffic intersection lights through the shield, that light may or may not be allowed to pass through the shield, as desired, and that the shield may be covered by a shield also adapted to cover a portion of the windshield. Manifestly, the invention adds considerably to improvements in automobiles.

Although more than one form of the invention has been illustrated and described in detail, it will be apparent to those skilled in the art that various modifications may be made without departing from the scope of the appended claims.

I claim:

1. In combination, a solid and substantially rigid automobile body roof having an opening, a unitary sheet metal frame for fitting around the edges of the opening and having a channel portion, a transparent sheet member mounted in the channel portion, and means comprising a hollow portion of the frame in the plane of the latter and outwardly of the edges of the transparent sheet member for holding the latter and frame in place.

2. In combination, a solid and substantially rigid automobile body roof having an opening, a unitary sheet metal frame for extending around the edge of the opening at the upper side of the roof and having a channel portion, a transparent sheet member mounted in the channel portion, means for fastening the frame to the roof, and means comprising an extended, upper side of the frame for concealing the fastening means.

3. In combination, a solid and substantially rigid automobile body having an opening, a unitary sheet metal frame disposed against one side of the body around the edges of the opening and having a channel portion, a transparent sheet member mounted in the channel portion, one portion of the frame being bent to provide a hollow portion around the outer edge of the frame, and means partially disposed in the hollow portion for fastening the frame to the body, said hollow portion being shaped to conceal the fastening means.

4. A unitary transparent shield frame, having a guideway for receiving edges of the shield, a hollow portion extending around the outer periphery of the guideway and defined by spaced walls disposed substantially in the plane of the guideway, one of said walls having an elongated slot for allowing the shank of headed fastening means to pass therethrough while retaining the head within the hollow portion.

5. A transparent shield frame, having a guideway for receiving edges of the shield, a hollow portion extending around the outer periphery of the guideway and defined by spaced walls disposed substantially in the plane of the guideway, one of said walls having an elongated slot for allowing the shank of headed fastening means to pass therethrough while retaining the head within the hollow portion, and means at one or more points along the slot for allowing insertion of the head on the fastening means and then moving of the latter along the slot into head retaining positions.

6. In combination, an automobile body having an opening, a unitary sheet metal frame having a channel for receiving the edges of a shield, and an extension at the outer side of the channel forming a hollow portion extending around the frame, said extension having an elongated slot extending around sides of the frame, and bolts having heads in the hollow portion and shank portions projecting through the slot and adapted to extend into the body around the opening to hold the frame in place, said slot being enlarged at certain points to permit insertion of the bolt heads.

7. In combination, an automobile body having an opening, a unitary sheet metal frame having a guideway for receiving the edges of a shield and having a corner portion, an extension at the outer side of the guideway forming a hollow portion extending around the frame, said extension having an elongated slot extending around sides of the frame, and bolts having heads in the hollow portion and shank portions extending through the slot and adapted to extend into the body around the opening to hold the frame in place, said slot terminating at the corner portion of the frame in an enlarged opening for permitting insertion of the bolt heads.

8. A sheet metal roof frame having a channel guideway for receiving and retaining a glass or the like, one leg of the channel having a reversely directed portion substantially in the plane of the frame and terminating in a reversely directed flange substantially in the plane of the other leg of the channel thereby providing a hollow portion at the side of the channel, and means projecting from the guideway portion and cooperating with the flange to provide an elongated slot for receiving fastening means.

JOHN W. J. ACKERMANS.